United States Patent
Lin et al.

(10) Patent No.: US 9,103,348 B2
(45) Date of Patent: Aug. 11, 2015

(54) DC MOTOR DEVICE AND DC FAN USING THE SAME

(71) Applicant: DELTA ELECTRONICS, INC., Taoyuan Hsien (TW)

(72) Inventors: Hsin-Chih Lin, Taoyuan Hsien (TW); Ya-Sen Tu, Taoyuan Hsien (TW); Lee-Long Chen, Taoyuan Hsien (TW); Kuo-Cheng Lin, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 205 days.

(21) Appl. No.: 13/944,381

(22) Filed: Jul. 17, 2013

(65) Prior Publication Data

US 2014/0227105 A1 Aug. 14, 2014

(30) Foreign Application Priority Data

Feb. 8, 2013 (TW) .............................. 102105119 A

(51) Int. Cl.
*H02P 6/00* (2006.01)
*F04D 25/06* (2006.01)
*F04D 25/10* (2006.01)
*H02P 7/28* (2006.01)

(52) U.S. Cl.
CPC .......... *F04D 25/0693* (2013.01); *F04D 25/105* (2013.01); *H02P 7/2805* (2013.01)

(58) Field of Classification Search
CPC ....... H02M 1/12; H02M 1/15; H02M 5/4585; H02P 2101/30; H02P 9/30
USPC ..................... 318/400.01, 700, 811
See application file for complete search history.

(56) References Cited

U.S. PATENT DOCUMENTS

| | | | |
|---|---|---|---|
| 5,818,194 A * | 10/1998 | Nordby | 318/701 |
| 6,942,612 B2 * | 9/2005 | Caspary et al. | 600/22 |
| 8,362,724 B2 * | 1/2013 | Woodward | 318/400.09 |
| 2010/0285731 A1* | 11/2010 | Kim | 454/239 |
| 2011/0204832 A1* | 8/2011 | Zavodny et al. | 318/400.3 |

* cited by examiner

*Primary Examiner* — Rita Leykin
(74) *Attorney, Agent, or Firm* — Muncy, Geissler, Olds & Lowe, P.C.

(57) ABSTRACT

A DC motor device includes a first converting circuit, a second converting circuit, and a DC motor. A switch element is coupled to the DC motor device, and provides an alternating current to the first or second converting circuit. The first converting circuit receives the alternating current, and generates a first rotation speed signal. The second converting circuit receives the alternating current, and generates a second rotation speed signal. The DC motor is driven at a rotation speed according to the first or second rotation speed signal.

20 Claims, 3 Drawing Sheets

DC MOTOR DEVICE AND DC FAN USING THE SAME

CROSS-REFERENCE TO RELATED APPLICATIONS

This Application claims priority of Taiwan Patent Application No. 102105119, filed on Feb. 8, 2013, the entirety of which is incorporated by reference herein.

BACKGROUND OF THE INVENTION

1. Field of the Invention

The present invention relates to a motor device, and in particular, to a DC device.

2. Description of the Related Art

Due to the popularity of environmental friendliness, users desire electric equipment with low power consumption. However, most electric equipment uses an AC (alternating current) motor with high power consumption. As shown in FIG. 1, a conventional AC fan A1 includes an AC motor device A10, a housing A20, an impeller A30, a switch element A40, and a connector A50. The AC motor device A10 is disposed in the housing A20, and includes an AC motor A11 and a connector A12 coupled to the AC motor A11. The impeller A30 pivots on the AC motor A11, and driven by the AC motor A11. The switch element A40 may be a mechanical switch disposed on the housing A20. The switch element A40 may be electrically connected to the connector A12 by the connector A50.

When a manufacturer wants to manufacture a DC (direct current) fan with a DC motor, redesigning of a circuit and wire is needed. Moreover, additional parts may be added, such as a new housing or a new switch. Thus, the manufacturing cost of the DC fan is high, decreasing consumer demand.

BRIEF SUMMARY OF THE INVENTION

To solve the problems of the prior art, the present disclosure provides a DC (direct current) motor device to replace the AC (alternating current) motor of an AC fan, and then the AC fan may be upgraded to a DC Fan, such that, the manufacturing cost of a DC Fan.

The present disclosure provides a DC motor device for an alternating current and coupled to a switch element. The DC motor device includes a first converting circuit and a second converting circuit. The first converting circuit includes a first rectifier circuit and a first modulator module. The first rectifier circuit receives the alternating current and generates a first direct current. The first modulator module generates a first rotation speed signal according to the alternating current. The second converting circuit includes a second rectifier circuit and a second modulator module. The second rectifier circuit receives the alternating current and generates a second direct current. The second modulator module generates a second rotation speed signal according to the alternating current. The DC motor receives one of the first direct current and the second direct current, and is driven at a corresponding rotation speed according to one of the first rotation speed signal and the second rotation speed signal. The switch element selectively applies the alternating current to one of the first converting circuit and the second converting circuit.

The present disclosure provides a DC fan including the described DC motor device, a switch element, and an impeller. The switch element is coupled to the DC motor device. The impeller pivots on the DC motor of the DC motor device. When the switch element is located at a first rotation speed position, the DC motor drives the impeller to rotate at a first rotation speed according to the first rotation speed signal. When the switch element is located at a second rotation speed position, the DC motor drives the impeller to rotate at a second rotation speed according to the second rotation speed signal.

In conclusion, the AC fan may be upgraded to a DC fan by replacing the AC motor in the AC fan, and thus the manufacturing cost of the DC fan is decreased.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2:
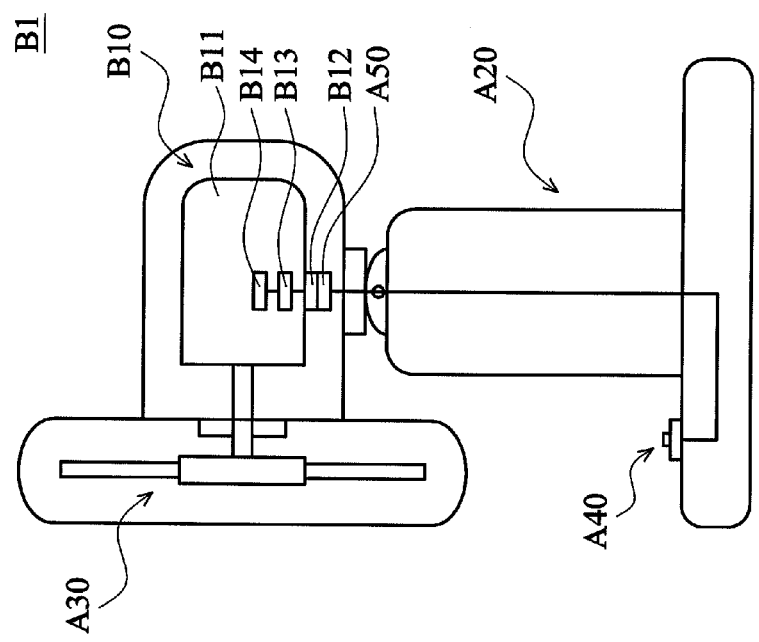
FIG. 2 is a schematic view of a DC fan according to the present disclosure.

FIG. 2 is a schematic view of a DC fan B1 according to the present disclosure. The DC fan B1 may be any type of equipments with a fan, such as a household fan, a range hood, an air conditioner, a turbine engine, or an electrical generator. In this embodiment, the DC fan B1 is a household fan. The DC fan B1 includes a DC motor device B10, a housing A20, an impeller A30, a switch element A40, and a connector A50. The DC motor device B10 is disposed in the housing A20, and includes a DC motor B11, a connector B12, a power control module B13, and a motor controller B14. In the embodiment, the DC motor B11 is for direct current, and is driven at different rotation speeds according to the current or the voltage of different direct currents. For example, the DC motor B11 may be a DC brushless motor, or may be a single-phase motor, a three-phase motor, or multi-phase motor, but is not limited thereto.

The connector B12 is coupled to the power control module B13, and the power control module B13 is coupled to the DC motor B11 and the motor controller B14. In the embodiment, the power control module B13 and the motor controller B14 are disposed on the DC motor B11. The impeller A30 pivots on the DC motor B11, and is driven by the DC motor B11. The switch element A40 may be a mechanical switch disposed on the housing A20. The switch element A40 may be coupled to the connector A50 via a wire. The connector A50 is plugged to the connector B12, and thus the switch element A40 is electrically connected to the power control module B13 by the connector A50 and the connector B12.

Figure 1:
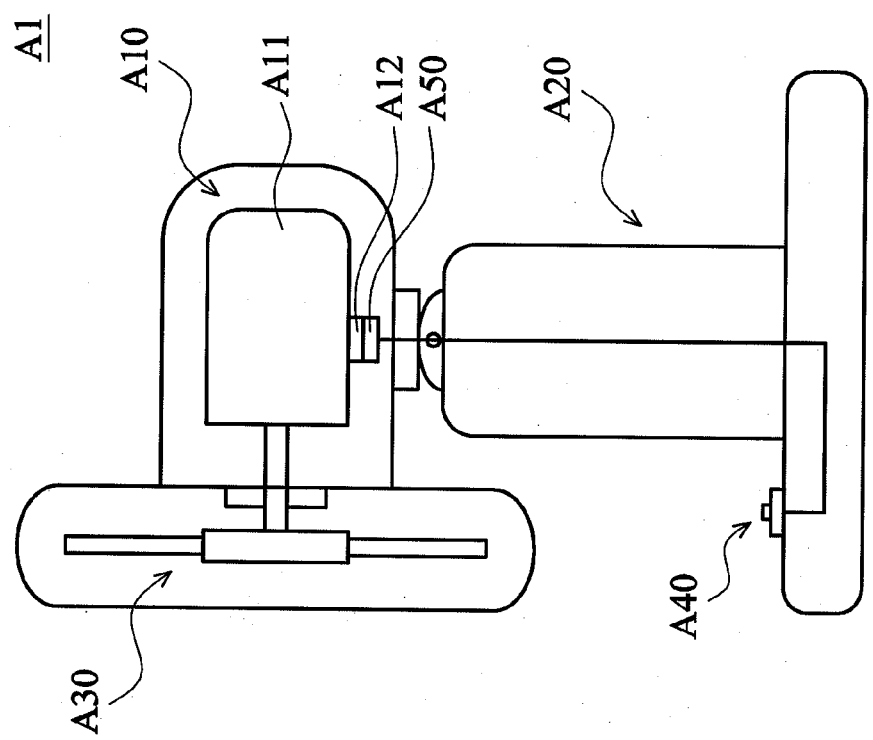
FIG. 1 is a schematic view of a conventional AC fan.

As shown in FIG. 2, some elements, such as the housing A20, the impeller A30, the switch element A40, the connector A50, and/or the connector B12 of the embodiment, may be the same as the elements of the AC fan A1 as shown in FIG. 1, and no redesigning of the elements is needed. Thus, a manufacturer may upgrade the conventional AC fan A1 to the DC fan B1 of the present disclosure by removing the conventional AC motor device A10 in the AC fan A1, installing the DC motor device B10 of the embodiment into the housing A20, and connecting the connector B12 to the connector A50. Thus, the manufacturing cost of the DC fan B1 is greatly decreased. Moreover, since the DC motor B11 only requires about half of the power of that of the AC motor A11, the DC motor B11 saves power and is environmentally friendly.

Figure 3:
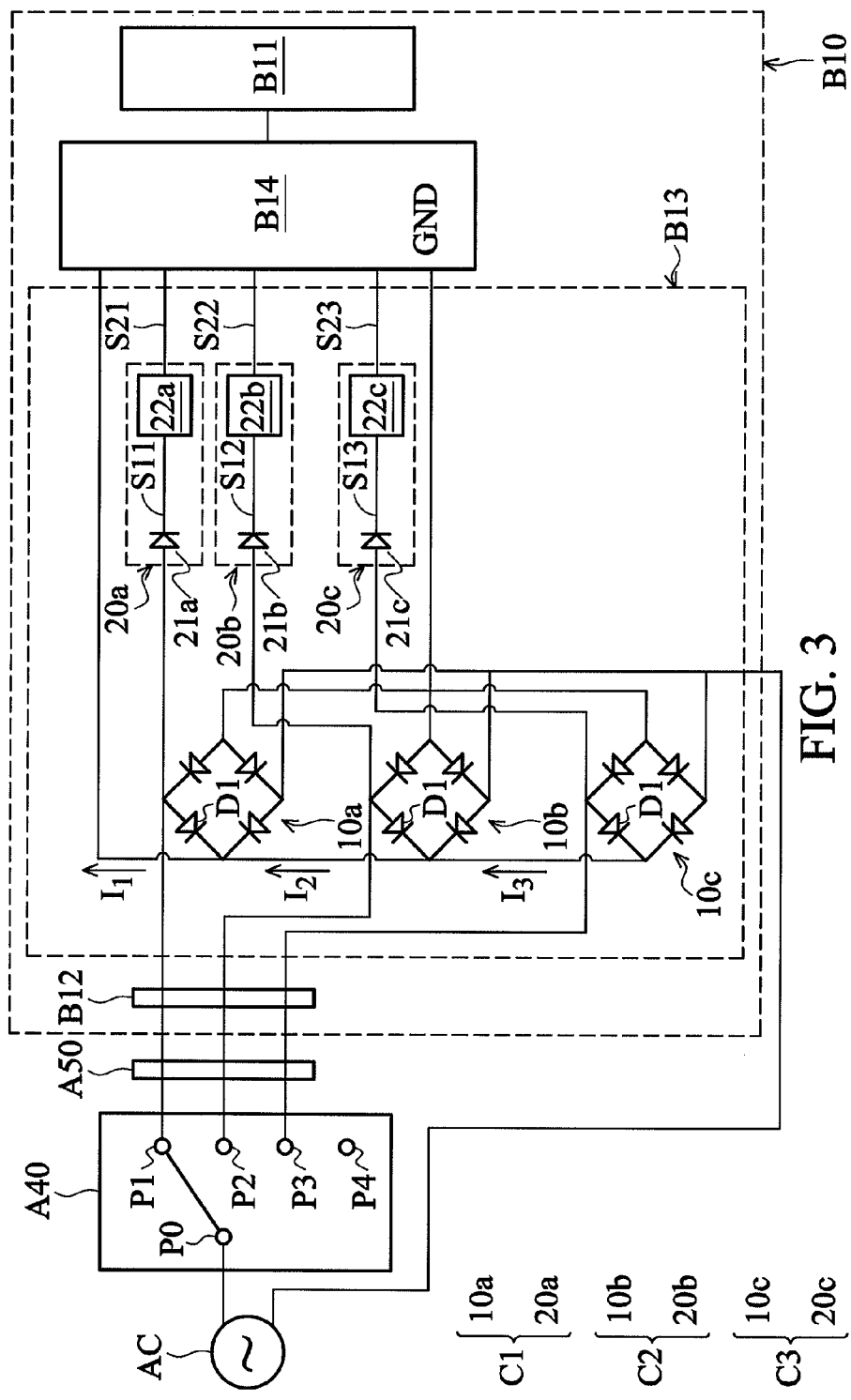
FIG. 3 is a circuit diagram of the DC motor device according to the present disclosure.

FIG. 3 is a circuit diagram of the DC motor device B10 according to the present disclosure. The switch element A40 is coupled to an AC power source AC, and receives alternating current from the AC power source AC. The switch element A40 may be a mechanical switch. The contact point P0 may be selectively coupled to the contact point P1, P2, P3, or P4 by rotating or pressing the switch element A40. When the contact point P0 is coupled to the contact point P4, the switch element A40 stops applying the alternating current to the DC motor device B10. The connector A50 is coupled to the switch element A40, and the connector B12 is plugged and electrically connected to the connector A50.

The power control module B13 includes a first converting circuit C1, a second converting circuit C2, and a third converting circuit C3. The first converting circuit C1 is coupled to the contact point P1 of the switch element A40 and the motor controller B14. The second converting circuit C2 is coupled to the contact point P2 of the switch element A40 and the motor controller B14. The third converting circuit C3 is coupled to the contact point P3 of the switch element A40 and the motor controller B14. Namely, each of the converting circuits corresponds to one of the contact points of the switch element A40. Thus, the alternating current is selectively applied to the first, second, or third converting circuit C1, C2, or C3 via the switch element A40. For example, when the contact point P0 is coupled to the contact point P1, the alternating current is applied to the first converting circuit C1 via the switch element A40.

In the embodiment, there are three converting circuits and contact points as an example. However, the number of converting circuits and the contact points are not limited. Moreover, the circuit structure or function of the second converting circuit C2 and the third converting circuit C3 may be the same as the first converting circuit C1. Therefore, further detailed descriptions of the second converting circuit C2 and the third converting circuit C3 are not described for brevity.

The first converting circuit C1 includes a first rectifier circuit 10a and a first modulator module 20a. The first rectifier circuit 10a may be a bridge rectifier including four diodes D1.

The first rectifier circuit 10a is coupled to the contact point P1 of the switch element A40 via the connector B12 and the connector A50. The first rectifier circuit 10a is coupled to the AC power source AC and the first modulator module 20a. The first rectifier circuit 10a receives the alternating current from the AC power source AC, and applies a first direct current I1 to the motor controller B14.

The first modulator module 20a includes a first diode 21a and a first modulator circuit 22a. The first diode 21a is coupled to the contact point P1 of the switch element A40 via the connector B12 and the connector A50. The first modulator module 20a is coupled to the first rectifier circuit 10a and the first modulator circuit 22a. The first diode 21a receives the alternating current, and applies a first trigger signal S11 to the first modulator circuit 22a.

The first modulator circuit 22a may be a pulse width modulation (PWM) circuit, a voltage divider circuit, or an operation amplifier circuit. The first modulator circuit 22a is coupled to the first diode 21a and the motor controller B14. The first modulator circuit 22a receives the first trigger signal S11, and applies a first rotation speed signal S21 to the motor controller B14.

The second converting circuit C2 includes a second rectifier circuit 10b and a second modulator module 20b. The second rectifier circuit 10b receives the alternating current, and applies a second direct current I2 to the motor controller B14. The second modulator module 20b includes a second diode 21b and a second modulator circuit 22b. The second diode 21b receives the alternating current, and applies a second trigger signal S12 to the second modulator circuit 22b. The second modulator circuit 22b receives the second trigger signal S12, and applies a second rotation speed signal S22 to the motor controller B14.

The third converting circuit C3 includes a third rectifier circuit 10c and a third modulator module 20c. The third rectifier circuit 10c receives the alternating current, and applies a third direct current I3 to the motor controller B14. The third modulator module 20c includes a third diode 21c and a third modulator circuit 22c. The third diode 21c receives the alternating current, and applies a third trigger signal S13 to the third modulator circuit 22c. The third modulator circuit 22c receives the third trigger signal S13, and applies a third rotation speed signal S23 to the motor controller B14.

In the embodiment, the first, second and third trigger signals S11, S12 and S13 have voltages which are the same as the alternating current, such as 110V (or 220V). The first, second and third modulator circuits 22a, 22b and 22c change the voltages of the first, second, and third trigger signals S11, S12, and S13 to make the first, second, and third rotation speed signals S21, S22 and S23 having different voltages. Namely, the voltage of the first, second and third trigger signals S11, S12 and S13 is different from the voltages of the first, second and third rotation speed signals S21, S22 and S23. For example, the voltages of the first, second and third rotation speed signals S21, S22 and S23 are 5V, 3V and 2V.

The motor controller B14 is coupled to the DC motor B11. The motor controller B14 receives the first, second and third direct currents I1, I2 and I3 and the first, second and third rotation speed signals S21, S22 and S23 to drive the DC motor B11. Moreover, the motor controller B14 has a ground terminal GND coupled to the first, second and third rectifier circuits 10a, 10b and 10c. In the embodiment, since the motor controller B14 is conventional art, further detailed description will not be provided for brevity.

The DC motor B11 receives the first, second or third direct current I1, I2 or I3, and is driven at a rotation speed corresponding to the first, second or third rotation speed signal S21, S22 or S23. In the embodiment, when the switch element A40 is located at a first rotation speed position, the contact point P0 is coupled to the contact point P1. Next, the switch element A40 applies the alternating current to the first converting circuit C1. Thus, the DC motor B11 receives the first direct current I1, and is driven at a corresponding rotation speed, such as 5000 rounds per second, according to the first rotation speed signal S21.

When the switch element A40 is located at a second rotation speed position, the contact point P0 is coupled to the contact point P2. The switch element A40 applies the alternating current to the second converting circuit C2. Thus, the DC motor B11 receives the second direct current I2, and is driven at a corresponding rotation speed, such as 3000 rounds per second, according to the second rotation speed signal S22.

When the switch element A40 is located at a third rotation speed position, the contact point P0 is coupled to the contact point P3. Next, the switch element A40 applies the alternating current to the third converting circuit C3. Thus, the DC motor B11 receives the third direct current I3, and is driven at a corresponding rotation speed, such as 2000 rounds per second, according to the third rotation speed signal S23. Therefore, the DC motor B11 may be driven at different rotation speeds by operating the switch element A40.

In the embodiment, the DC motor B11 may be driven at different rotation speeds because the voltages of the first, second and third rotation speed signals S21, S22 and S23 are different. Further, the voltages of the first, second and third rotation speed signals S21, S22 and S23 are adjusted by the first, second and third modulator circuits 22a, 22b and 22c. For example, a manufacturer may replace or adjust the first, second and third modulator circuits 22a, 22b and 22c to change the voltages of the first, second and third rotation speed signals S21, S22 and S23. Thereby, the rotation speeds of the DC motor B11 can be adjusted without replacing the entire power control module B13 and the motor controller B14. Moreover, the DC motor device B10 may be for an alternating current with a different voltage by adjusting the voltages of the first, second and third rotation speed signals S21, S22 and S23. Thus, the manufacturing cost of the DC fan B1 is decreased.

In conclusion, the AC fan can be upgraded to a DC fan by replacing the AC motor in the AC fan, and thus, manufacturing cost of the DC fan is decreased.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A DC motor device for an alternating current and coupled to a switch element, the DC motor device comprising:
    a first converting circuit, comprising:
        a first rectifier circuit, receiving the alternating current, generating a first direct current; and
        a first modulator module, receiving the alternating current, generating a first rotation speed signal;
    a second converting circuit, comprising:
        a second rectifier circuit, receiving the alternating current, generating a second direct current; and
        a second modulator module, receiving the alternating current, generating a second rotation speed signal; and
    a DC motor, receiving one of the first direct current and the second direct current, driven at a corresponding rotation speed according to one of the first rotation speed signal and the second rotation speed signal,
    wherein the switch element selectively applies the alternating current to one of the first converting circuit and the second converting circuit.

2. The DC motor device as claimed in claim 1, wherein a voltage of the first rotation speed signal is different from a voltage of the second rotation speed signal.

3. The DC motor device as claimed in claim 1, wherein the first modulator module comprises:
    a first diode, receiving the alternating current, generating a first trigger signal; and
    a first modulator circuit, receiving a first trigger signal, generating a first rotation speed signal.

4. The DC motor device as claimed in claim 3, wherein a voltage of the first trigger signal is different from a voltage of the first rotation speed signal.

5. The DC motor device as claimed in claim 3, wherein the first modulator circuit is a pulse width modulation circuit, a voltage divider circuit, or an operation amplifier circuit.

6. The DC motor device as claimed in claim 1, wherein the second modulator module comprises:
    a second diode, receiving the alternating current, generating a second trigger signal; and
    a second modulator circuit, receiving the second trigger signal, generating the second rotation speed signal.

7. The DC motor device as claimed in claim 6, wherein a voltage of the second trigger signal is different from a voltage of the second rotation speed signal.

8. The DC motor device as claimed in claim 6, wherein the second modulator circuit is a pulse width modulation circuit, a voltage divider circuit, or an operation amplifier circuit.

9. The DC motor device as claimed in claim 1, wherein each of the first rectifier circuit and the second rectifier circuit is a bridge rectifier.

10. The DC motor device as claimed in claim 1, comprising a first connector coupled to the first modulator module and the second modulator module.

11. The DC motor device as claimed in claim 1, comprising a motor controller disposed on the DC motor and coupled to the first converting circuit and the second converting circuit.

12. The DC motor device as claimed in claim 1, comprising a third converting circuit, comprising:
    a third rectifier circuit, receiving the alternating current, generating a third direct current; and
    a third modulator module, receiving the alternating current, generating a third rotation speed signal,
    wherein the DC motor, receiving one of the first direct current, the second direct current, and the third direct current, driven at a corresponding rotation speed according to one of the first rotation speed signal, the second rotation speed signal, and the third rotation speed signal.

13. The DC motor device as claimed in claim 12, wherein the switch element selectively applies the alternating current to one of the first converting circuit, the second converting circuit, and the third converting circuit.

14. The DC motor device as claimed in claim 13, wherein a voltage of the first rotation speed signal, a voltage of the second rotation speed signal, and a voltage of the third rotation speed signal are different.

15. The DC motor device as claimed in claim 13, wherein the third modulator module comprises:
    a third diode, receiving the alternating current, generating a third trigger signal; and
    a third modulator circuit, receiving a third trigger signal, generating a third rotation speed signal.

16. The DC motor device as claimed in claim 5, wherein a voltage of the third trigger signal is different from a voltage of the third rotation speed signal.

17. A DC fan, comprising:
    a DC motor device as claimed in claim 1;
    a switch element coupled to the DC motor device; and
    an impeller pivoted on the DC motor of the DC motor device,
    wherein when the switch element is located at a first rotation speed position, the DC motor drives the impeller to rotate at a first rotation speed according to the first rotation speed signal,
    wherein when the switch element is located at a second rotation speed position, the DC motor drives the impeller to rotate at a second rotation speed according to the second rotation speed signal.

18. The DC motor device as claimed in claim 17, wherein the switch element is a mechanical switch.

19. The DC fan as claimed in claim 17, comprising a housing, wherein the DC motor device is disposed in the housing, and the switch is disposed on the housing.

20. The DC fan as claimed in claim 17, comprising a second connector connected to the first connector, wherein the switch element is electrically connected to the DC motor device by the first and second connector.

* * * * *